US011573957B2

(12) United States Patent
Zeng et al.

(10) Patent No.: US 11,573,957 B2
(45) Date of Patent: Feb. 7, 2023

(54) NATURAL LANGUAGE PROCESSING ENGINE FOR TRANSLATING QUESTIONS INTO EXECUTABLE DATABASE QUERIES

(71) Applicant: salesforce.com, inc., San Francisco, CA (US)

(72) Inventors: Jichuan Zeng, Hong Kong (CN); Xi Lin, Palo Alto, CA (US); Chu Hong Hoi, Singapore (SG)

(73) Assignee: Salesforce.com, Inc., San Francisco, CA (US)

( * ) Notice: Subject to any disclaimer, the term of this patent is extended or adjusted under 35 U.S.C. 154(b) by 345 days.

(21) Appl. No.: 16/866,034

(22) Filed: May 4, 2020

(65) Prior Publication Data
US 2021/0173829 A1   Jun. 10, 2021

Related U.S. Application Data

(60) Provisional application No. 62/945,833, filed on Dec. 9, 2019.

(51) Int. Cl.
*G06F 16/242* (2019.01)
*G06F 16/2452* (2019.01)
(Continued)

(52) U.S. Cl.
CPC ...... *G06F 16/243* (2019.01); *G06F 16/24524* (2019.01); *G06F 40/284* (2020.01); *G06F 40/47* (2020.01)

(58) Field of Classification Search
CPC ............. G06F 16/243; G06F 16/24524; G06F 40/47; G06F 40/284
See application file for complete search history.

(56) References Cited

U.S. PATENT DOCUMENTS 8,557,678 B2   10/2013   Wang et al.
8,586,432 B2   11/2013   Wang et al.
(Continued)

FOREIGN PATENT DOCUMENTS

CN   109766355 A   *   5/2019

OTHER PUBLICATIONS

Zhong, SeQ2SQL, 2017, Salesforce reasearch, whole ddocument (Year: 2017).*

(Continued)

*Primary Examiner* — Sonia L Gay
(74) *Attorney, Agent, or Firm* — Haynes and Boone, LLP

(57) ABSTRACT

A system and method for translating questions into database queries are provided. A text to database query system receives a natural language question and a structure in a database. Question tokens are generated from the question and query tokens are generated from the structure in the database. The question tokens and query tokens are concatenated into a sentence and a sentence token is added to the sentence. A BERT network generates question hidden states for the question tokens, query hidden states for the query tokens, and a classifier hidden state for the sentence token. A translatability predictor network determines if the question is translatable or untranslatable. A decoder converts a translatable question into an executable query. A confusion span predictor network identifies a confusion span in the untranslatable question that causes the question to be untranslatable. An auto-correction module to auto-correct the tokens in the confusion span.

20 Claims, 8 Drawing Sheets

(51) Int. Cl.
  *G06F 40/47* (2020.01)
  *G06F 40/284* (2020.01)

(56) References Cited

U.S. PATENT DOCUMENTS

| | | | |
|---|---|---|---|
| 8,748,267 | B2 | 6/2014 | Wang et al. |
| 8,824,647 | B2 | 9/2014 | Lin |
| 8,969,911 | B2 | 3/2015 | Wang et al. |
| 8,984,401 | B2 | 3/2015 | Wong et al. |
| 9,054,303 | B2 | 6/2015 | Lin et al. |
| 9,087,958 | B2 | 7/2015 | Wang et al. |
| 9,147,835 | B2 | 9/2015 | Lin et al. |
| 9,431,506 | B2 | 8/2016 | Lin et al. |
| 9,698,248 | B2 | 7/2017 | Liu et al. |
| 10,211,203 | B2 | 2/2019 | Lin et al. |
| 10,282,663 | B2 | 5/2019 | Socher et al. |
| 10,346,721 | B2 | 7/2019 | Albright et al. |
| 10,474,709 | B2 | 11/2019 | Paulus |
| 10,475,798 | B2 | 11/2019 | Lin et al. |
| 10,521,465 | B2 | 12/2019 | Paulus |
| 10,542,270 | B2 | 1/2020 | Zhou et al. |
| 10,558,750 | B2 | 2/2020 | Lu et al. |
| 10,565,305 | B2 | 2/2020 | Lu et al. |
| 10,565,306 | B2 | 2/2020 | Lu et al. |
| 10,565,318 | B2 | 2/2020 | Bradbury |
| 10,565,493 | B2 | 2/2020 | Merity et al. |
| 10,573,295 | B2 | 2/2020 | Zhou et al. |
| 10,592,767 | B2 | 3/2020 | Trott et al. |
| 10,685,962 | B2 | 6/2020 | Lin et al. |
| 10,741,563 | B2 | 8/2020 | Lin et al. |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0140240 | A1 | 5/2017 | Socher et al. |
| 2018/0096219 | A1 | 4/2018 | Socher |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0268287 | A1 | 9/2018 | Johansen et al. |
| 2018/0268298 | A1 | 9/2018 | Johansen et al. |
| 2018/0336453 | A1 | 11/2018 | Merity et al. |
| 2018/0373682 | A1 | 12/2018 | Mccann et al. |
| 2018/0373987 | A1 | 12/2018 | Zhang et al. |
| 2019/0130218 | A1 | 5/2019 | Albright et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0188568 | A1 | 6/2019 | Keskar et al. |
| 2019/0213482 | A1 | 7/2019 | Socher et al. |
| 2019/0251431 | A1 | 8/2019 | Keskar et al. |
| 2019/0258714 | A1 | 8/2019 | Zhong et al. |
| 2019/0258901 | A1 | 8/2019 | Albright et al. |
| 2019/0258939 | A1 | 8/2019 | Min et al. |
| 2019/0286073 | A1 | 9/2019 | Asl et al. |
| 2019/0295530 | A1 | 9/2019 | Asl et al. |
| 2019/0355270 | A1 | 11/2019 | Mccann et al. |
| 2019/0362020 | A1 | 11/2019 | Paulus et al. |
| 2020/0005765 | A1 | 1/2020 | Zhou et al. |
| 2020/0057805 | A1 | 2/2020 | Lu et al. |
| 2020/0065651 | A1 | 2/2020 | Merity et al. |
| 2020/0084465 | A1 | 3/2020 | Zhou et al. |
| 2020/0089757 | A1 | 3/2020 | Machado et al. |
| 2020/0090033 | A1 | 3/2020 | Ramachandran et al. |
| 2020/0090034 | A1 | 3/2020 | Ramachandran et al. |
| 2020/0103911 | A1 | 4/2020 | Ma et al. |
| 2020/0104643 | A1 | 4/2020 | Hu et al. |
| 2020/0104699 | A1 | 4/2020 | Zhou et al. |
| 2020/0105272 | A1 | 4/2020 | Wu et al. |
| 2020/0117854 | A1 | 4/2020 | Lu et al. |
| 2020/0117861 | A1 | 4/2020 | Bradbury |

OTHER PUBLICATIONS

Hwang et al., A Comprehensive Exploration on WikiSQL with Table Aware Word Contextualization, 2019, arXiv, whole document (Year: 2019).*

Diana Archangeli. 1988. Aspects of underspecification theory. Phonology, 5(2):183-207.

Arthur et al., "Semantic parsing of ambiguous input through paraphrasing and verification". (2015) TACL, 3:571-584.

Bertomeu, et al., "Contextual phenomena and thematic relations in database QA dialogues: results from a wizard-of-Oz experiment". In Proceedings of the Interactive Question Answering Workshop at HLT-NAACL 2006, pp. 1-8, New York, NY, USA. Association for Computational Linguistics.

Bogin et al., "Representing schema structure with graph neural networks for text-to-sql parsing". In Proceedings of the 57th Conference of the Association for Computational Linguistics, ACL 2019, Florence, Italy, Jul. 28- Aug. 2, 2019, vol. 1: Long Papers, pp. 4560-4565.

Bogin et al., "Global reasoning over database structures for text-to-sql parsing". arXiv:1908.11214v1 [cs.CL] Aug. 29, 2019.

Budzianowski, et al., "Multiwoz—A large-scale multi-domain wizard-of-oz dataset for task-oriented dialogue modelling." In Proceedings of the 2018 Conference on Empirical Methods in Natural Language Processing, Brussels, Belgium, Oct. 31-Nov. 4, 2018, pp. 5016-5026.

Dahl, et al., "Expanding the scope of the ATIS task: The ATIS-3 corpus". In Human Language Technology, Proceedings of a Workshop held at Plainsboro, New Jersey, USA, Mar. 8-11, 1994.

Devlin, et al. "BERT: pre-training of deep bidirectional transformers for language under-standing." In Proceedings of the 2019 Conference of the North American Chapter of the Association for Computational Linguistics: Human Language Technologies, NAACL-HLT 2019, Minneapolis, MN, USA, Jun. 2-7, 2019, vol. 1 (Long and Short Papers), pp. 4171-4186.

DeYoung, et al. "ERASER: A benchmark to evaluate rationalized NLP models". arXiv:1911.03429v2 [cs.CL] Apr. 24, 2020.

Dong et al. "Language to logical form with neural attention." In Proceedings of the 54th Annual Meeting of the Association for Computational Linguistics, ACL 2016, Aug. 7-12, 2016, Berlin, Germany, vol. 1: Long Papers. The Association for Computer Linguistics.

Dong, et al. "Confidence modeling for neural semantic parsing". In (Gurevych and Miyao, 2018), pp. 743-753.

Finegan-Dollak, et al., "Improving text-to-sql evaluation methodology". In (Gurevych and Miyao, 2018), pp. 351-360.

Gao, et al., "Fewrel 2.0: Towards more challenging few-shot relation classification". Proceedings of the 2019 Conference on Empirical Methods in Natural Language Processing and the 9th International Joint Conference on Natural Language Processing, pp. 6250-6255, Hong Kong, China, Nov. 3-7, 2019. c 2019 Association for Computational Linguistics.

Godin et al., "Learning when not to answer: a ternary reward structure for reinforcement learning based question answering". In Proceedings of the 2019 Conference of the North American Chapter of the Association for Computational Linguistics: Human Language Technologies, NAACL-HLT 2019, Minneapolis, MN, USA, Jun. 2-7, 2019, vol. 2 (Industry Papers), pp. 122-129. Association for Computational Linguistics.

Lars Grammel, Melanie Tory, and Margaret-Anne D. Storey. 2011. Erratum to "how information visualization novices construct visualizations". IEEE Trans. Vis. Comput. Graph., 17(2):260.

Guo et al., "Towards complex text-to-sql in cross-domain database with intermediate representation". In Proceedings of the 57th Conference of the Association for Computational Linguistics, ACL 2019, Florence, Italy, Jul. 28-Aug. 2, 2019, vol. 1: Long Papers, pp. 4524-4535.

He, et al., "X-sql: reinforce schema representation with context". (2019) arXiv preprint arXiv:1908.08113.

Hemphill, et al., "The ATIS spoken language systems pilot corpus". In Speech and Natural Language: Proceedings of a Workshop Held at Hidden Valley, Pennsylvania, USA, Jun. 24-27, 1990.

(56) References Cited

OTHER PUBLICATIONS

Huang, et al., "Relation module for non-answerable predictions on reading comprehension". In Proceedings of the 23rd Conference on Computational Natural Language Learning (CoNLL), (2019) pp. 747-756, Hong Kong, China. Association for Computational Linguistics.

Hwang et al., "A comprehensive exploration on wikisql with table-aware word contextualization," arXiv:1902.01069v2 [cs.CL] Nov. 11, 2019.

Kumar, et al., "Dialogue act sequence labeling using hierarchical encoder with CRF". In Proceedings of the Thirty-Second AAAI Conference on Artificial Intelligence, (AAAI-18), the 30th innovative Applications of Artificial Intelligence (IAAI-18), and the 8th AAAI Symposium on Educational Advances in Artificial Intelligence (EAAI-18), New Orleans, Louisiana, USA, Feb. 2-7, 2018, pp. 3440-3447. AAAI Press.

Liang, et al., "Neural symbolic machines: Learning semantic parsers on freebase with weak supervision". In Proceedings of the 55th Annual Meeting of the Association for Computational Linguistics, ACL 2017, Vancouver, Canada, Jul. 30-Aug. 4, 2017, vol. 1: Long Papers, pp. 23-33. Association for Computational Linguistics.

Lin et al., "Grammar-based neural text-to-sql generation". arXiv:1905.13326v1 [cs.CL] May 30, 2019.

Liu, et al., "Towards explainable NLP: A generative explanation framework for text classification". Proceedings of the 57th Annual Meeting of the Association for Computational Linguistics, pp. 5570-5581, Florence, Italy, Jul. 28-Aug. 2, 2019.

Luong, et al., "Effective approaches to attention-based neural machine translation". In Proceedings of the 2015 Conference on Empirical Methods in Natural Language Processing, EMNLP 2015, Lisbon, Portugal, Sep. 17-21, 2015, pp. 1412-1421.

Min, et al., "A discrete hard EM approach for weakly supervised question answering". arXiv:1909.04849v1 [cs.CL] Sep. 11, 2019.

Mou, et al., "Natural language inference by tree-based convolution and heuristic matching". In Proceedings of the 54th Annual Meeting of the Association for Computational Linguistics, ACL 2016, Aug. 7-12, 2016, Berlin, Germany, vol. 2: Short Papers.

Coria, et al., "Prediction of dialogue acts on the basis of the previous act". Procesamiento del Lenguaje Natural, n°39 (2007), pp. 223-230.

Pennington, et al., "Glove: Global vectors for word representation". In Proceedings of the 2014 Conference on Empirical Methods in Natural Language Processing, EMNLP 2014, Oct. 25-29, 2014, Doha, Qatar, A meeting of SIGDAT, a Special Interest Group of the ACL, pp. 1532-1543.

Popescu, et al., "Towards a theory of natural language inter-faces to databases". In Proceedings of the 8th Inter-national Conference on Intelligent User Interfaces, IUI 2003, Miami, FL, USA, Jan. 12-15, 2003, pp. 149-157. ACM.

Rajpurkar, et al., "Know what you don't know: Unanswerable questions for squad". In Proceedings of the 56th Annual Meeting of the Association for Computational Linguistics, ACL 2018, Melbourne, Australia, Jul. 15-20, 2018, vol. 2: Short Papers, pp. 784-789.

Roberts, et al. "A semantic parsing method for mapping clinical questions to logical forms". In AMIA 2017, American Medical Informatics Association Annual Symposium, Washing-ton, DC, USA, Nov. 4-8, 2017. AMIA:1478-1487.

Setlur, et al., "Inferencing underspecified natural language utterances in visual analysis". In Proceedings of the 24th Inter-national Conference on Intelligent User Interfaces, IUI 2019, Marina del Ray, CA, USA, Mar. 17-20, 2019, pp. 40-51. ACM.

Su, et al., "Controlling risk of web question answering". In Proceedings of the 42nd Inter-national ACM SIGIR Conference on Research and Development in Information Retrieval, SIGIR 2019, Paris, France, Jul. 21-25, 2019, pp. 115-124. ACM.

Suhr, et al., "Learning to map context-dependent sentences to executable formal queries". In Proceedings of the 2018 Conference of the North American Chapter of the Association for Computational Linguistics: Human Language Technologies, NAACL-HLT 2018, New Orleans, Louisiana, USA, Jun. 1-6, 2018, vol. 1 (Long Papers), pp. 2238-2249.

Sun, et al., "U-net: Machine reading comprehension with unanswerable questions". arXiv:1810.0663v1 [cs.CL] Oct. 12, 2018.

Tan, et al., "I know there is no answer: Modeling answer validation for machine reading comprehension". In Natural Language Processing and Chinese Computing—7th CCF International Conference, NLPCC 2018, Hohhot, China, Aug. 26-30, 2018, Proceedings, Part I, vol. 11108 of Lecture Notes in Computer Science, pp. 85-97. Springer. (Abstract Only).

Tanaka, et al., "Dialogue-act prediction of future responses based on conversation history". In Proceedings of the 57th Annual Meeting of the Association for Computational Linguistics: Student Research Workshop (2019), pp. 197-202, Florence, Italy. Association for Computational Linguistics.

Vladimir Naumovich Vapnik. 2000. The Nature of Statistical Learning Theory, Second Edition. Statistics for Engineering and Information Science. Springer. (Abstract Only).

Achille C Varzi, "Vagueness, logic, and ontology", The Dialogue. Yearbooks for Philosophical Hermeneutics 1 (2001), 135-154.

Xu, et al., "Sql-net: Generating structured queries from natural language without reinforcement learning". arXiv:1711.04436v1 [cs.CL] Nov. 13, 2017.

Yu, et al., "Typesql: Knowledge-based type-aware neural text-to-sql generation". In Proceedings of the 2018 Conference of the North American Chapter of the Association for Computational Linguistics: Human Language Technologies, NAACL-HLT, New Orleans, Louisiana, USA, Jun. 1-6, 2018, vol. 2 (Short Papers), pp. 588-594.

Yu, et al., "Cosql: A conversational text-to-sql challenge to-wards cross-domain natural language interfaces to databases". arXiv;1909.05378v1 [cs.CL] Sep. 11, 2019.

Yu, et al., "Spider: A large-scale human-labeled dataset for complex and cross-domain semantic parsing and text-to-sql task". In Proceedings of the 2018 Conference on Empirical Methods in Natural Language Processing, Brussels, Belgium, Oct. 31-Nov. 4, 2018, pp. 3911-3921.

Yu, et al., "Sparc: Cross-domain semantic parsing in context". arXiv:1906.02285v1 [cs.CL] Jun. 5, 2019, pp. 4511-4523.

Zelle et al., "Learning to parse database queries using inductive logic programming". In Proceedings of the Thirteenth National Conference on Artificial Intelligence and Eighth Innovative Applications of Artificial Intelligence Conference, AAAI 96, IAAI 96, Portland, Oregon, USA, Aug. 4-8, 1996, vol. 2., pp. 1050-1055.

Zellers, et al., "Swag: A large-scale adversarial dataset for grounded commonsense inference". In Proceedings of the 2018 Conference on Empirical Methods in Natural Language Processing, Brussels, Belgium, Oct. 31-Nov. 4, 2018, pp. 93-104. Association for Computational Linguistics.

Zettlemoyer, et al., "Learning to map sentences to logical form: Structured classification with probabilistic categorial grammars". In UAI '05, Proceedings of the 21st Conference in Uncertainty in Artificial Intelligence, Edinburgh, Scotland, Jul. 26-29, 2005, pp. 658-666. AUAI Press.

Zhang, et al., "Editing-based SQL query generation for cross-domain context-dependent questions". arXiv:1909.00786v2 [cs.CL] Sep. 10, 2019.

Zhong, et al. Seq2sql: Generating structured queries from natural language using reinforcement learning. arXiv:1709.00103v7 [cs.CL] Nov. 9, 2017.

Zhu, et al., "Learning to ask unanswerable questions for machine reading comprehension". arXiv:1906.06045v1 [cs.CL] Jun. 14, 2019.

\* cited by examiner

Algorithm 1 Procedure to generate untranslatable examples for UTran-SQL.

Require:
$S$ - Source dataset, consists of tuples of question, schema, and SQL, $(q, s, SQL)$.
$N$ - Number of samples to be replaced in each iteration.
procedure GENERATEDATA($S$)
    $\mathcal{D}' \leftarrow \emptyset$         ▷ Rule-based transformation
    for $(q, s, SQL)$ in $S$ do
        $q' \leftarrow \text{ExtractType}(q, s)$
        $i \leftarrow \text{ChooseRandom}(\{i : q'_i = \text{'column'}\})$
        $q_{swap} \leftarrow QuestionSwap(q, i)$
        $\mathcal{D}' \leftarrow \mathcal{D}' \cup (q_{swap}, s, none)$
        $j \leftarrow \text{ChooseRandom}(\{j : q'_j = \text{'column'}\})$
        $q_{drop} \leftarrow QuestionDrop(q, j)$
        $\mathcal{D}' \leftarrow \mathcal{D}' \cup (q_{drop}, s, none)$
        $k \leftarrow \text{ChooseRandom}(\{k : k\text{-th header in } SQL\})$
        $s_{drop} \leftarrow \text{SchemaDrop}(s, k)$
        $\mathcal{D}' \leftarrow \mathcal{D}' \cup (q, s_{drop}, none)$
    end for
                                        ▷ Adversarial filtering
    Randomly choose a candidate set $\mathcal{D} \subset \mathcal{D}'$
    while not converge do
        $\mathcal{D}_{train}, \mathcal{D}_{test} \leftarrow \text{RandomSplit}(\mathcal{D}' \cup S)$
        Optimize $f_\theta$ on $\mathcal{D}_{train}$
        $\mathcal{D}_{easy} \leftarrow \{d \in \mathcal{D}_{test} \cap \mathcal{D} : f_\theta(d) = 0\}$
        $\mathcal{D}_{hard} \leftarrow \{d \in \mathcal{D}_{test} \setminus \mathcal{D} : f_\theta(d) = 1, d \in \mathcal{D}'\}$
        $\mathcal{D} \leftarrow \text{Replacement}(\mathcal{D}, \mathcal{D}_{easy}, \mathcal{D}_{hard}, N)$
    end while
    return $\mathcal{D}$
end procedure

*FIG. 4*

| Transformation | | Original data | Transformed data | Confusing text span |
|---|---|---|---|---|
| Question | Swap | Q1: How many *conductors* are there? <br> S1: [ Conductor_ID ][ Name ][ Age ][ Nationality][ Year_of_Work ] <br> Q2: What are the maximum and minimum values of *area codes*? <br> S2: [ Vote_ID ][ Phone_Number ][ Area_Code ][ State ][ Created ] | Q1: How many soloists are there? <br> Q2: What are the maximum and minimum values of types? | soloists <br><br> types |
| | Drop | Q1: How many *countries* exist? <br> S1: [ CountryId ][ CountryName ][ Continent ] <br> Q2: What is the *official language* spoken in the country whose head of state is Beatrix? <br> S2: [ CountryCode ][ HeadOfState ][ Capital ][ Language ][ IsOfficial ][ Percentage ] | Q1: How many are there? <br><br> Q2: What are the people in the country where Beatrix is located? | WHOLE SENTENCE <br><br> WHOLE SENTENCE |
| Schema Drop | | Q1: How much *surface area* do the countries in the Carribean cover together? <br> S1: [ Name ][ Continent ][ Region ][ *SurfaceArea* ][ Population ][ LifeExpectancy ] <br> Q2: Find the name and *age* of the visitor who bought the most tickets at once. <br> S2: [Customer_ID]Name]Level_of_membership][ *Age* ] | S1: [ Name ][ Continent ][ Region ][ Population ][ LifeExpectancy ] <br><br> S2: [Customer_ID]Name]Level_of_membership] | surface area <br><br><br> age |

*FIG. 5*

| Question | DB Schema | Untranslatable Scenario |
|---|---|---|
| Which *weeks* did New Zealand win? | Player|Country|Year(s) won|Total|To par| | "weeks" cannot be found in DB schema. |
| In which series did the driver get 30? | Position|Driver|Points|Winnings|Series| | Question dose not specify the subject of "30". |
| Where is the youngest *nurse* from? | Teacher_ID|Name|Age|Hometown| | "nurse" is irrelevant to the DB schema. |
| What is the highest poker player? | People_ID|Final_Table_Made|Best_Finish|Money_Rank|Earnings| | "highest" is ambiguous, can refers to Money_Rank or Earnings. |

*FIG. 6*

NATURAL LANGUAGE PROCESSING ENGINE FOR TRANSLATING QUESTIONS INTO EXECUTABLE DATABASE QUERIES

PRIORITY APPLICATION DATA

This application claims priority to U.S. Provisional Application No. 62/945,833 filed on Dec. 9, 2019 and entitled "A Natural Language Processing Engine for Translating Untranslatable Questions into Database Queries."

TECHNICAL FIELD

The embodiments relate generally to natural language processing, and more specifically to translating a natural language question into a database query.

BACKGROUND

Text to database query systems translate natural language questions into executable database queries. However, the text to database query systems cannot translate all natural language questions into executable queries. This is because the text to database query systems use a dataset that assumes that every natural language question corresponds to a single database query. Such text to database query systems may generate only the most confident query tokens that may be formulated into a query as output, regardless of whether the natural language question can be translated into a query, e.g. a SQL query and executed using the existing database schema.

BRIEF DESCRIPTION OF THE DRAWINGS

FIG. 4 is a diagram showing an algorithm for generating untranslatable questions, according to some embodiments.

FIG. 5 is a diagram of a table that illustrates question side and schema side transformations, according to some embodiments.

FIG. 6 is a diagram of a table that illustrates confusion spans that are predicted using the text to database query translation module, according to some embodiments.

In the figures, elements having the same designations have the same or similar functions.

DETAILED DESCRIPTION

Synthesizing a database query, such as a structured language query ("SQL"), from a natural language question helps users. This is because users can search and analyze vast amount of data stored in a relationship database efficiently and without database knowledge. The natural language text to database query systems, such as text to database query synthesizing systems, can be adopted to various products, such as virtual assistance systems, online customer service systems, etc.

The embodiments describe a text to database query system that receives a question and determines whether the question can be translated into one or more database queries given particular database information, such as a database schema. If the text to database query system determines that the question can be translated into a database query given database information, the text to database query system outputs the query. However, if the text to database query system determines that the question cannot be translated into a query, the text to database query system may identify a confusion span in the question that hinders the translation. The confusion span includes indices to a subset of words (or tokens) that are included in the question. In some embodiments, the text to database query system may identify another token(s) from database information that may replace the one or more tokens in the confusion span in the. In this case, the text to database query system may attempt to generate a query using the question with the replaced tokens.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
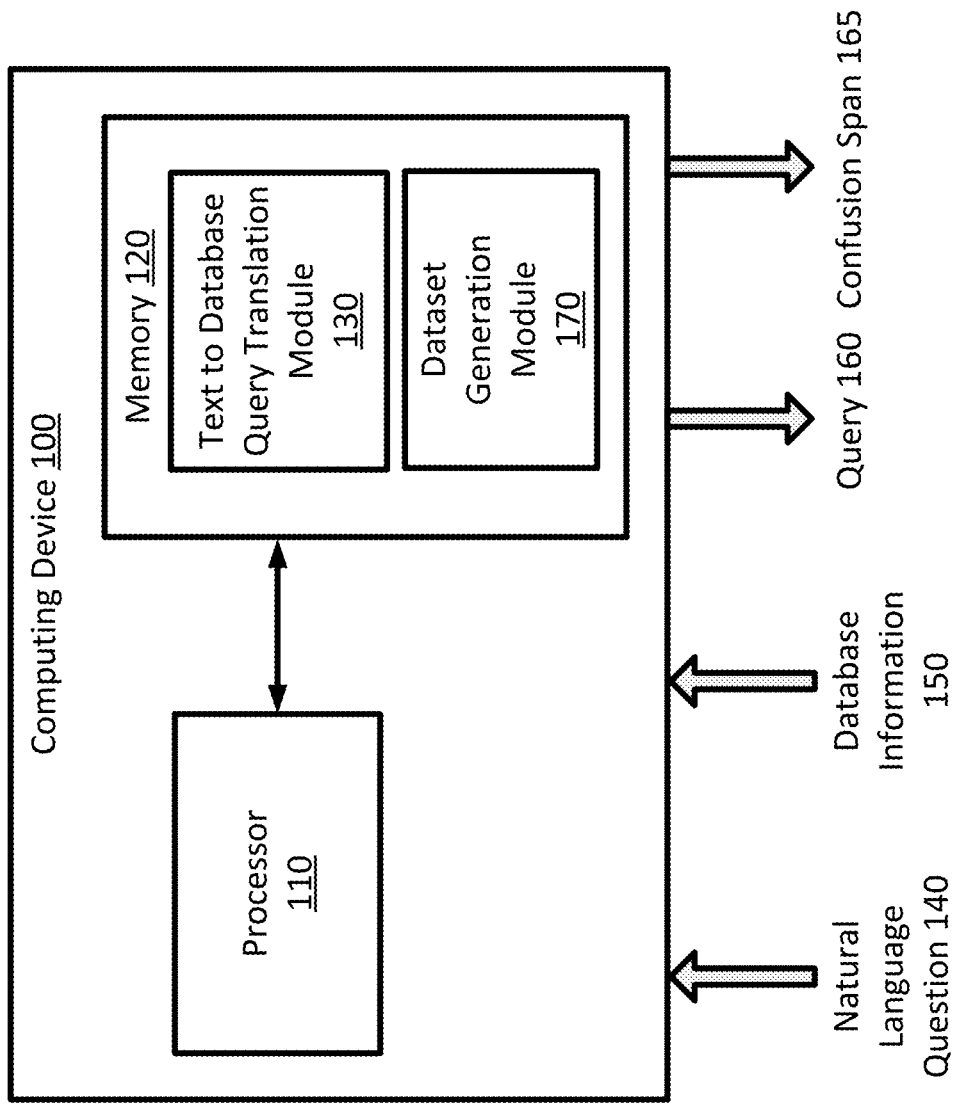
FIG. 1 is a simplified diagram of a computing device for implementing a question answering system according to some embodiments.

FIG. 1 is a simplified diagram of a computing device 100 for implementing a question answering system according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a text to database query translation module 130 that may be used to implement and/or emulate the systems and models, and/or to implement any of the methods described further herein. In some examples, the text to database query translation module 130 may translate natural language questions that are a string of text into database queries, such as SQL queries. The text to database query translation module may receive input that includes a natural language question 140 (or simply question 140) and a database information 150. The natural language question 140 may be a question that computing device 100 received from a user or from another computing device. In a non-limiting embodiment, the natural language question 140 may be a string that includes text, e.g. alpha numeric text that is divided into words or tokens. Database information 150 may be a structure in a database such as a database schema or a portion of a database schema that includes names of tables, names of columns in the tables, etc.

As shown in FIG. 1, computing device 100 receives input such as a natural language question 140 and database information 150, which is provided to the text to database query translation module 130. The text to database query translation module 130 operates on the natural language question 140 and database information 150 to generate an output that is an executable database query 160 that corresponds to the natural language question 140 or alternatively a confusion span 165 which indicates that the natural language question 140 cannot be translated in an executable query given database information 150.

Figure 2A:
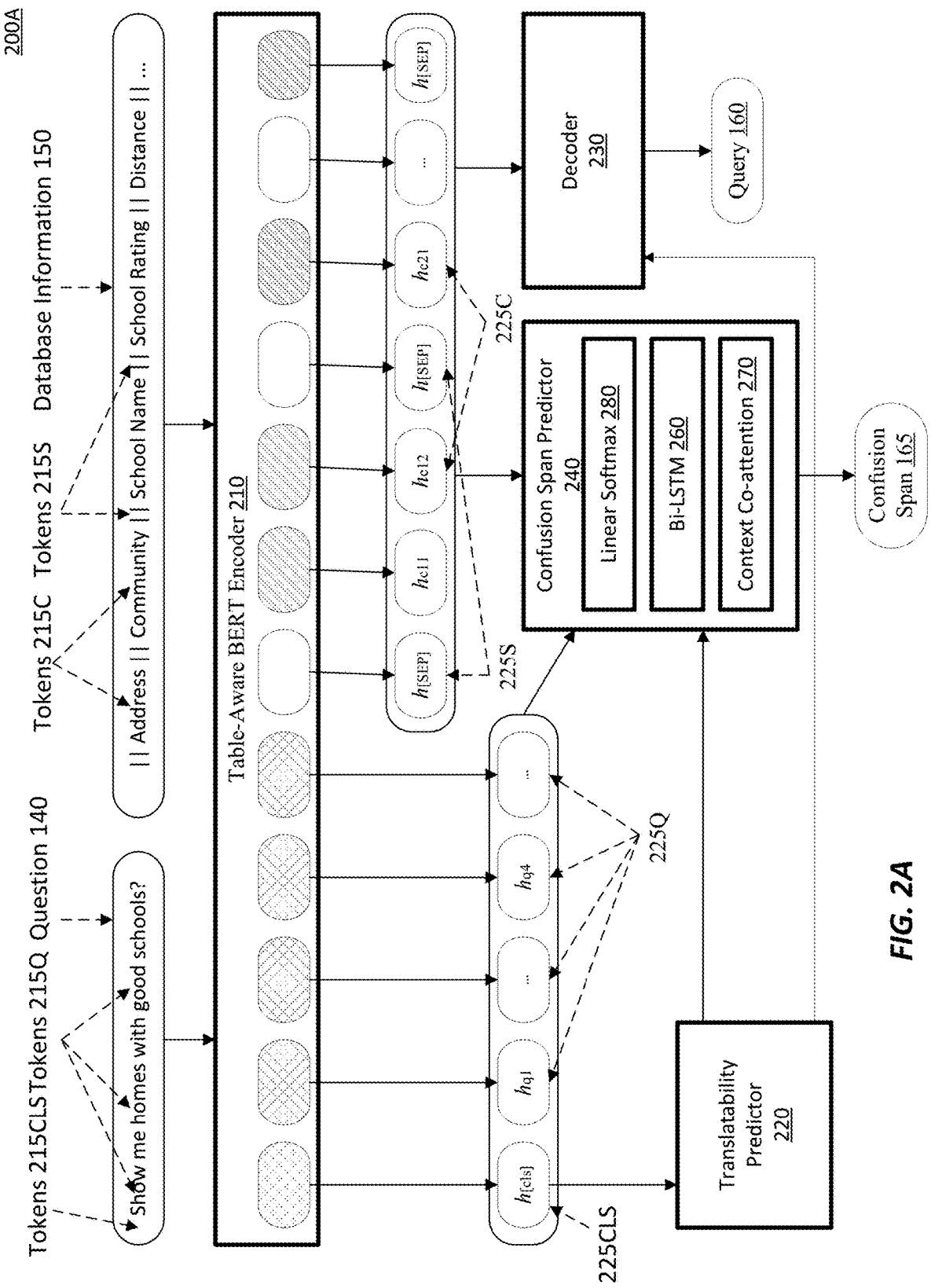
FIG. 2A is block diagram of a text to database query translation module that translates a natural language question into a query or generates a confusion span, according to some embodiments.
Figure 2B:
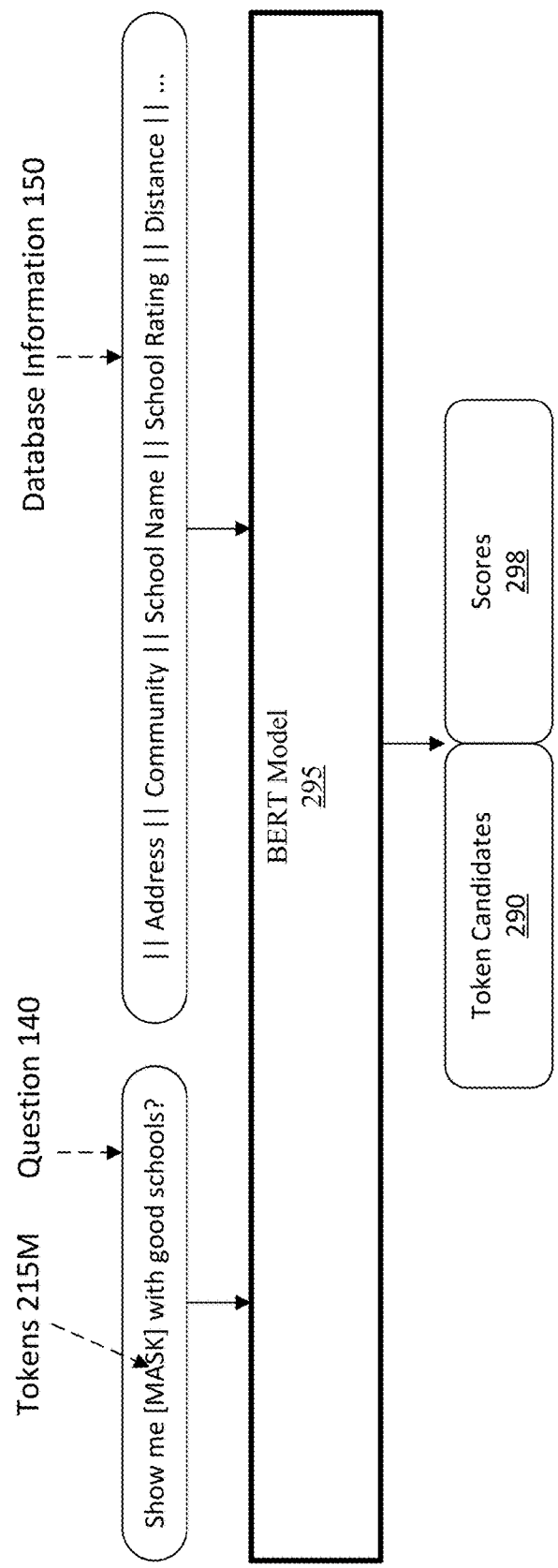
FIG. 2B is a block diagram of a masked language model BERT model that identifies a token that replaces a token in a confusion span, according to some embodiments.

In some embodiments, the text to database query translation module 130 may include one or more neural networks illustrated in FIGS. 2A and 2B. Unlike conventional text to database query networks that formulate a query regardless of whether the query can be executed by the database, the text to database query translation module 130 may determine whether the natural language question 140 may be translated into an executable query 160 using database information 150. As discussed above, example database information 150 may be a database schema. If the natural language question 140 is not a translatable question give database information 150, text to database query translation module 130 may determine a confusion span 165, e.g. one or more words (tokens) in the natural language question 140, that prevent the text to database query translation module 130 from translating the natural language question 140 into the executable query 160.

Further, because translatability depends on database information 150, the same natural language question 140 may be translated into query 160 given one database information 150 and may not be translated given another database information. For example, text to database query translation module 130 may receive natural language question 140 that is "What is the alliance of airline United Airlines?" and database information 150 that includes a schema with a table that has the "Airline", "Airline Name", "Alliance", and "Fleet size", and translate the natural language question 140 in query 160 that is "SELECT Alliance FROM Airlines Name='United Airlines'." In another example, text to database query translation module 130 may receive natural language question 140 that is "What is the code of airline United Airlines?" and database information 150 that includes a schema with a table that has the "Airline", "Airline Name", "Country", "Alliance", and "Fleet size". Based on the database information 150, text to database query translation module 130 may determine that natural language question 140 is an untranslatable question that has a confusion span "code". In some embodiments, text to database query translation module 130 may substitute the token "code" in the confusion span 165 with the token "Country" and then generate query 160 that is "SELECT Country FROM Airlines Name='United Airlines'."

FIG. 2A is a block diagram of a text to database query translation module 130, according to some embodiments of the disclosure. As illustrated in FIG. 2A, text to database query translation module 130 includes an encoder, such as Bi-directional Encoder Representations and Transformers (BERT) encoder 210, a translatability predictor 220, a decoder 230, and a confusion span predictor 240. Decoder 230 may be a database decoder, such as a SQL decoder that is trained to generate queries 160 in the SQL format.

Text to database query translation module 130 may receive natural language question 140 and database information 150 as input. Natural language question 140 and database information 150 may be concatenated into a single sentence. The sentence may include multiple tokens 215. Tokens 215 may represent words in natural language question 140, and column names of the tables (labeled as "Address", "Community, "School Name", etc., in FIG. 2) of a database in database information 150. As illustrated in FIG. 2, tokens 215Q are question tokens and may represent words in natural language question 140. Tokens 215C are query tokens and may represent table names of a schema in database information 150. Tokens 215S may be separator tokens that separate tokens 215Q from tokens 215C and tokens 215C that are associated with different column names in a table from each other. The sentence may also be appended with a token 215CLS may be used to classify the sentence that includes tokens 215Q, 215C, and 215S. In some embodiments, each token in tokens 215 may be associated with a position of each word in the single sentence.

BERT encoder 210 may receive the sentence as tokens 215. Example sequence may include token 215CLS, followed by question tokens 215Q, followed by a separator token 215S, and one or more query tokens 215C that indicate a table name, followed by another separator token 215, followed by query token(s) that indicate another table name, etc. Tokens 215C that belong to different table or column names are separated by token 215S.

The BERT encoder 210 may encode tokens 215 into token embeddings, which may be hidden states 225. In some embodiments, BERT encoder 210 may encode token 215CLS into an embedding with a hidden state 225CLS, question tokens 215Q into embeddings with question hidden states 225Q, separation tokens 215S into embeddings with hidden states 225S, and query tokens 215C into embeddings with column hidden states 225C. Hidden states 225 are contextual representations of tokens 215. The hidden state 225CLS may be a classification for the sentence.

In some embodiments, translatability predictor 220 may determine whether the natural language question 140 is a translatable or untranslatable question given database information 150. Translatability predictor 220 may be a neural network with a binary classification layer. The translatability predictor 220 may receive as input the hidden state 225CLS that is a contextual representation of token 215CLS. Based on the hidden state 225CLS, translatability predictor 220 may use determine, using single layer, e.g. binary classification and/or multi-layer perception (MLP) classifier a score that identifies whether natural language question 140 is a translatable or untranslatable question. For example, if the score is above (or equal to) a threshold 0, natural language question 140 is a translatable question and may be translated using decoder 230. Otherwise, if the score is below (or equal to) a threshold 0, natural language question 140 is an untranslatable translatable question. In this case, confusion span predictor 240 may determine the confusion span 165 in natural language question 140. Based on the score, translatability predictor 220 may activate either decoder 230 or confusion span predictor 240.

If translatability predictor 220 determines that the natural language question 140 may be answered using database information 150, the translatability predictor 220 may activate decoder 230. Decoder 230 may receive embeddings for a single sentence (hidden state 225CLS), embeddings for column headers (hidden states 225Q) and embeddings for column headers (hidden states 225S) and generate query 160 for natural language question 140. As discussed above, decoder 230 may be a trained neural network.

If translatability predictor 220 determines that the natural language question 140 may not be answered using database information 150, the translatability predictor 220 may activate the confusion span predictor 240. Confusion span predictor 240 also receives embeddings for a single sentence (hidden state 225CLS), embeddings for column headers (hidden states 225Q) and embeddings for column headers (hidden states 225S) and uses the hidden states 225 to identify confusion span 165. The confusion span 165 includes indices of a set of one or more tokens in tokens 215Q that hinder or prevent the text to database query translation module 130 from translating natural language question 140 into query 160.

In some embodiments, confusion span predictor 240 may include a bi-directional long-short term memory (bi-LSTM) layer 260, a context co-attention layer 270, and a linear softmax layer 280. The embeddings $h^C$ (hidden states 225C) for the column headers (table names) may be processed using the Bi-LSTM layer 260 and context co-attention layer 270. Bi-LSTM layer 260 may encode self attention vectors using embeddings $h^C$. Bi-LSTM layer 260 may then encode the question embeddings (hidden states 225Q) into utterance embeddings $h^U$.

The context co-attention layer 270 may receive the utterance embeddings $h^U$ and the column header embeddings $h^C$ and generate the co-attention vector $c_i^{token\text{-}column}$ as follows:

$$s_i = h^C W_{token\text{-}att} h_i^U$$

$$\alpha^{token\text{-}column} = \text{softmax}(s)$$

$$c_i^{token\text{-}column} = \Sigma_j \alpha_{i,j}^{token\text{-}column} \times h_j^C$$

where i is the index of question tokens 215Q associated with the words from the natural language question 140, j is the index of query tokens 215C associated with column headers in database information 150. The context vector c is the concatenation of the co-attention vector $c^{token\text{-}column}$ and original utterance embedding $h^U$ as follows:

$$c_i = [c_i^{token\text{-}column}, h_i^U]$$

The context vector c is an output of the context co-attention layer 270 and an input into the linear softmax layer 280. The linear softmax layer 280 may use the context vector c to predict the start and end token indices in query tokens 215Q that form confusion span 165. As discussed above, the confusion span 165 includes indices that correspond to a subset of query tokens 215Q that prevent the text to database query translation module 130 from translating the natural language question 140 into query 160. Typically, the indices in the confusion span 165 may be in chronological order and include a first index and the last index.

In some embodiments, text to database query translation module 130 may attempt to auto-correct the tokens in the confusion span 165. To auto-correct, text to database query translation module 130 may include a masked language model (MLM) in a BERT model. FIG. 2B is a block diagram of an MLM BERT model, according to some embodiments. The MLM BERT model 295 may receive input that includes question tokens 215Q in natural language question 140 and query tokens 215C. However, the subset of question tokens 215Q that are included in the confusion span 165 are replaced with a mask token 215M or token [MASK]. In some instances, the input may also be a single sentence includes question tokens 215Q, mast tokens 215M, query tokens 215C and separator token 215S. The MLM BERT model 295 may generate an output distribution of MLM on the mask token 215M. The output distribution may include one or more token candidates 290 that correspond to table names in database information 150 and corresponding scores 298. The scores 298 may indicate the probability that the corresponding token candidate in the token candidates 290 may replace the [MASK] token in natural language sentence 140, so that the text to database query transition module 130 may generate the executable query 160.

Figure 3:
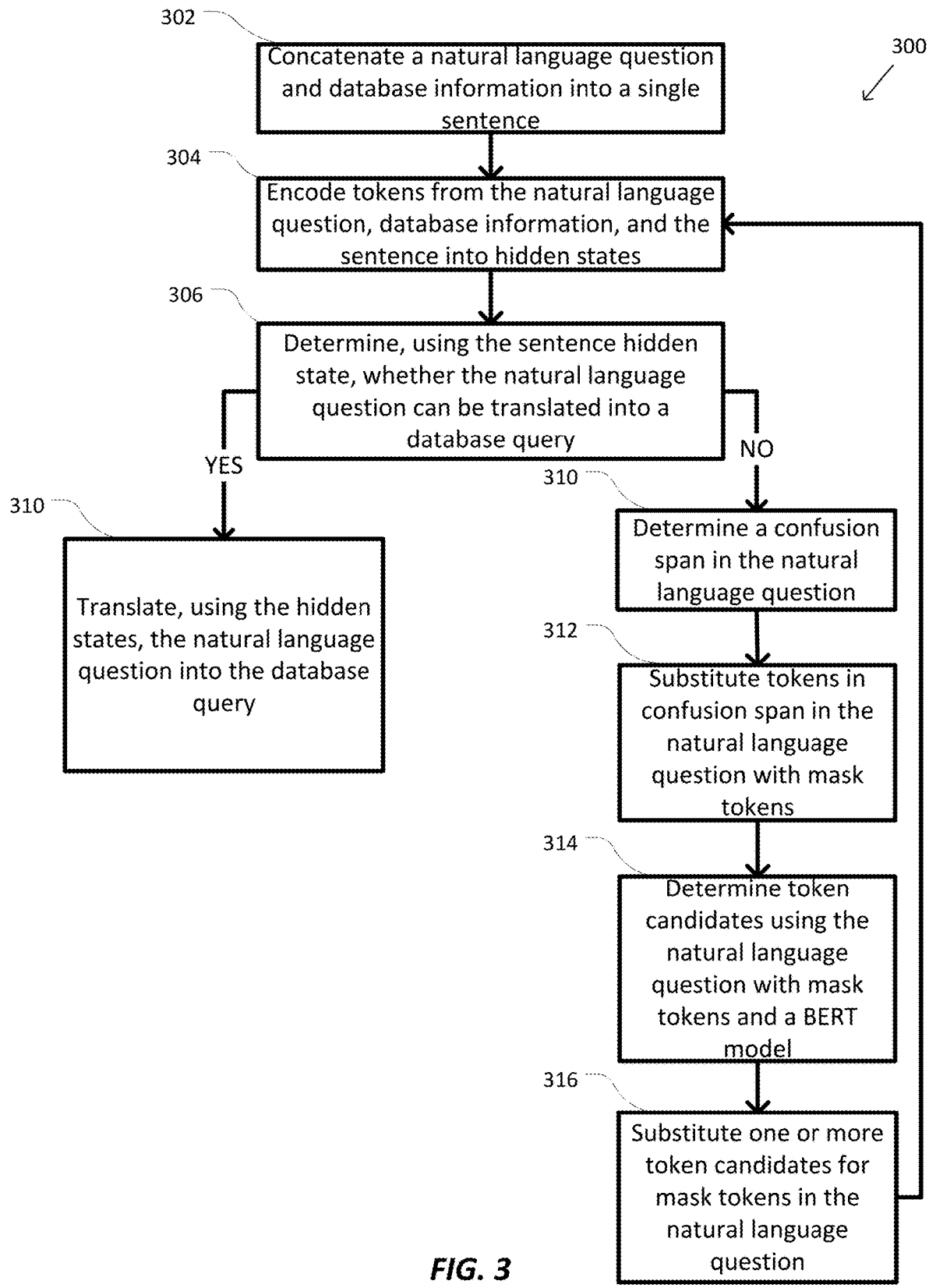
FIG. 3 is a simplified diagram of a method for translating a natural language question into a database query, according to some embodiments.

FIG. 3 is a simplified diagram of a method 300 for translating a natural language question into a database query, according to some embodiments. One or more of the processes 302-316 of method 300 may be implemented, at least in part, in the form of executable code stored on non-transitory, tangible, machine-readable media that when run by one or more processors may cause the one or more processors to perform one or more of the processes 302-316.

At process 302, a natural language question and database information is received and concatenated into a single sentence. For example, text to database query translation module 130, implemented as a neural network, receives natural language question 140 and database information 150. text to database query translation module 130 then forms a single sentence from natural language question 140 and database information 150. The single sentence includes CLS token 215CLS, question tokens 215Q, query tokens 215C, and separator tokens 215S. Token 215CLS corresponds to the sentence, tokens 215Q correspond to words in the natural language question 140, and tokens 215C and 215S that correspond to table names in a schema included database information 150 and separators for the table names.

At process 304, tokens are encoded into hidden states. For example, BERT encoder 210 may encode tokens 215CLS, 215Q, 215C, and 215S into hidden states 225CLS, 225Q, 225C, and 225S that are context representations of 215CLS, 215Q, 215C, and 215S.

At process 306, a determination whether the natural language question can be translated into the database query is made. For example, translatability predictor 220 in text to database query translation module 130 may use hidden state 225CLS to determine whether natural language question 140 can be translated into query 160 using database information 150. If natural language question 140 can be translated the method proceeds to process 308. Otherwise to process 310.

At process 308, natural language question is translated. For example, query decoder 230 may use the hidden states 225Q, 225C, and 225S to translate the natural language question 140 into query 160.

At process 310, a confusion span is identified. For example, confusion span predictor 240 may determine confusion span 165 that includes indices for a subset of tokens in question tokens 215Q associated with natural language question 140. The tokens 215Q in the subset may be words that prevent text to database query translation module 130 from translating the natural language question 140 into query 160.

At process 312, the tokens indicated by the confusion span are substituted with mask tokens. For example, text to database query translation module 130 may remove tokens in the set of tokens that are in confusion span 165 from query tokens 215Q and substitute to the tokens in the set of tokens with mask tokens.

At process 314, token candidates are identified. For example, text to database query translation module 130 may use the MLM BERT model 295 to determine token candidates 290 from query tokens 215Q, 215M, 215C, and 215S. The token candidates 290 may correspond to table names that may replace words in the confusion span 165. MLM BERT model 295 may also determine scores 298 for teach token candidate in token candidates 290 that may indicate the probability of each candidate token being the token that may be substituted for the mask token 215M to generate query 160.

At process 316, one or more token candidates are substituted into a natural language question. The text to database query translation module 130 may substitute the token candidates 290 into the natural language question 140 in place of the mask token 215M. In some instances, the text to database query translation module may substitute the token candidate 290 with a highest score 298. Subsequently, the method may proceed to process 304 where the text to database query translation module 130 may identify the query 160 for the natural language question 140 of process 314.

Going back to FIG. 1, in some embodiments, text to database query translation module 130 may be trained on a dataset prior to generating confusion span 165 or query 160. The dataset may include natural language questions 140 that are translatable and untranslatable into query 160 using database information 150. To generate the dataset, memory 120 may include a dataset generation module 170. Dataset generation module 170 may modify existing datasets, such as the WikiSQL dataset and the Spider dataset by adding untranslatable queries to the datasets. In some instances, dataset generation module 170 may perform a set of rule-based data transformations on natural language questions 140 and corresponding database information 150 to generate untranslatable questions.

In some embodiments, suppose dataset generation module 170 attempts to generate untranslatable query 160 in a text to database query example, that includes natural language question 140, a database schema in the database information 150 and query 160 that is SQL query. Dataset generation module 170 may identify one or more non-overlapping question spans that may refer to a table name field in the database schema that occurs in the "SELECT" and "WHERE" clauses of query 160. The one or more non-overlapping question spans may include one or more tokens in natural language question 140. Once the non-overlapping question spans are identified, dataset generation module 170 may then use question-side and schema-side transformation techniques on the non-overlapping question spans. Dataset generation module may also use a filtering technique that filters out similar untranslatable natural language questions 140.

The question-side technique may generate underspecified and ambiguous variants of natural language question 140. These variants may not be translated into queries 160 due to the ambiguity or information shortage in the database information 150. To generate the variants, dataset generation module 170 may use a swap technique and a drop technique.

In a swap technique, dataset generation module 170 may identify substitute words. For example, dataset generation module 170 may randomly identify a token (e.g. a word) in natural language question 140. Dataset generation module 170 may then extract one or more words that are similar to the meaning of the token. The one or more words may exclude words that have different part-of-speech tagging to the token or words that appear in column headers (table names) of a database schema in database information 150. For example, dataset generation module 170 may extract a configurable number of semantically similar words to a token based on e.g. GLoVe representations and remove the similar words that have different POS tags or appear in all the column names. The remaining extracted words may be substitute words. Dataset generation module 170 may then randomly substitute the token in the natural language question 140 with one or more substitute words.

In the drop technique, dataset generation module 170 may identify a token from a question span and remove the identified token or remove the token together with the proposition of the token. Alternatively, dataset generation module 170 may replace the token with "one" or "ones" according to its singular or plural forms of the token.

The schema-side technique may perform schema-side transformations that turn database schemas into variants that are not supported by the database information 150. Dataset generation module 170 may randomly select a table name from a database schema which is grounded to a question span identified above. Once a table name is selected, dataset generation module 170 may remove the table associated with the table name from a schema. In some instances, the removed table may not correspond to a table that is associated with a primary key or foreign key in the schema.

In some embodiments, dataset generation module 170 may also filter the untranslatable questions in the dataset to remove similar or repeating questions into a smaller set of the untranslatable questions. The filtered untranslatable questions may be added to a dataset that includes both translatable and untranslatable questions. Once dataset generation module 170 generates a dataset that includes translatable and not translatable questions, text to database query translation module 130 and its components discussed in FIG. 2A may be trained using the dataset. The trained text to database query translation module 130 may determine query 160 for the natural language question 140 given a schema or another structure in database information 150 or determine that the natural language question 140 is an untranslatable question.

FIG. 4 is a diagram 400 showing an algorithm for generating untranslatable questions, according to some embodiments. The dataset generation module 170 may implement the algorithm to determine untranslatable natural language questions. The algorithm may receive a source dataset S that may consist of tuples that include a question q (natural language question 140), a schema s (database information 150) and a SQL query (query 160). The tuple may also be referred to as (q, s, SQL). The algorithm may also receive a number N which correspond to a number of samples that may be replaced in a candidate set D' of untranslatable questions. For each tuple (q, s, SQL) in source dataset S, the algorithm may identify a question span q' using the ExtractType(q,s) function. Next, the algorithm, may randomly select a word in the question span q' and determine untranslatable queries for schema s using a query side swap technique (QuestionSwap (q,i)) and the selected word. The untranslatable questions for a corresponding schema s may be stored in the untranslatable candidate set D'. The algorithm may also randomly select another word from the question span q' and determine untranslatable questions using a query side drop technique (QuestionDrop (q,j)) and the selected word. The untranslatable questions for a corresponding schema s may also be added to the untranslatable candidate set D'. The algorithm may also randomly select a table name k and remove the table name from the schema using the schema side technique (SchemaDrop (s,k)) and generate schemas $s_{drop}$ for which question q is an untranslatable question. The untranslatable questions for a corresponding schema $s_{drop}$ may also be added to the untranslatable candidate set D'.

In some embodiments, the algorithm may also filter the untranslatable candidate set D' into a smaller untranslatable candidate set D. The smaller untranslatable candidate set D may include up to N candidates. The untranslatable candidate set D includes untranslatable questions that are not easily distinguished by stylistic models. In some instances, the filter may be an adversarial filter that may have a high empirical error I of the candidate set D over all leave-one-out train and test splits, as shown below:

$$I(D, f) = \frac{1}{N}\sum_{I=1}^{N} \mathcal{L}(f_{\theta_i^*}, \{(q_i, s_i, y_i)\}),$$

where $\theta_i^* = \mathrm{argmin}_\theta \ \mathcal{L}(F_\theta, D\backslash\{(q_i, s_iy_i)\})$ In some embodiments, the model family f that selects low-level stylistic features may not be predictive of whether the question is translatable or not given the schema. Thus, the final classifier may be an ensemble of several stylistic models. One model may be a multi-layer perceptron (MLP) given single layer LSTM language model perplexity trained on wikidata and the length of both question and number of table headers. Another model may be an MLP over Tfidf features from question and table header. Another model may be MLP over the averaged word embeddings from questions and table headers. Another model may be a bi-directional LSTM over the one hundred most common words in the question and another bi-directional LSTM over all the table headers. The uncommon words in this model may be replaced by their POS tags. The models may be ensembled by concatenating the final representations of the models and passing the untranslatable set of candidates D' through an MLP. Further, at every iteration, the ensemble of models may be trained to minimize cross-entropy. The filtering of untranslatable candidate set D' into a smaller untranslatable candidate set D is illustrated in the algorithm under "adversarial filtering" where N candidates are replaced in the smaller untranslatable candidate set D at each iteration.

FIG. 5 is a diagram 500 of a table that illustrates question side and schema side transformations, according to some embodiments. As discussed above, the question side transformations of the question may be made using the swap and drop techniques, and the schema side transformation may be made using the schema drop technique. FIG. 5 illustrates a transformation type in the "Transformation" column, the original questions (Q1, Q2) and schemas (S1, S2) in the "Original data" column, the transformed questions (Q1, Q2) and/or schemas (S1, S2) in the "Transformed data" column. The confusing text span in the corresponding question or schema is shown in the "Confusing text span" column. The italicized words in the original data column may be words that are swapped or dropped using the corresponding swap or drop technique. The words in bold in the transformed data column may be words that replace the italicized words in the original data column.

FIG. 6 is a diagram 600 of a table that illustrates untranslatable examples that are predicted using the text to database query translation module 130. The table includes a "Question" column that includes natural language questions 140, a "DB Schema" column that includes a database schema (or another structure in database information 150) and an "Untranslatable Scenario" column which indicates a reason for why text to database query translation module 130 was not able to translate natural language questions 140 into queries 160. Also, the italicized words in natural language questions 140 indicate confusion spans 165.

Figure 7:
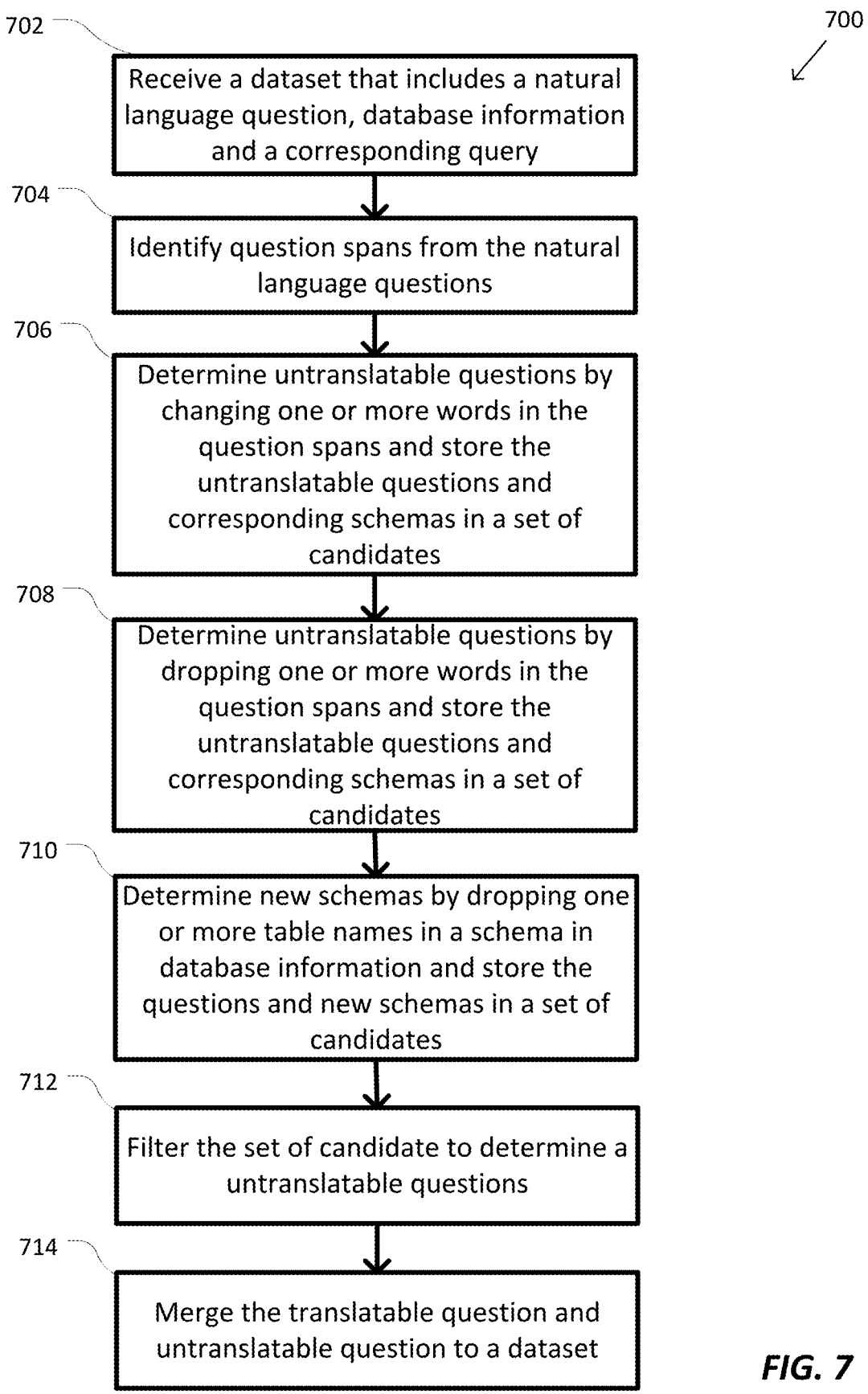
FIG. 7 is a simplified diagram of a method for generating a dataset that includes translatable and untranslatable questions, according to some embodiments.

FIG. 7 is a simplified diagram of a method 700 for generating a dataset that includes translatable and untranslatable questions, according to some embodiments. One or more of the processes 702-714 of method 700 may be implemented, at least in part, in the form of executable code stored on non-transitory, tangible, machine-readable media that when run by one or more processors may cause the one or more processors to perform one or more of the processes 702-714.

At process 702, a dataset that includes translatable natural language questions and corresponding database information and queries is received. An example dataset may be a WikiSQL dataset or a Spider dataset. Dataset generation module 170 may receive a dataset that includes natural language questions 140, database information 150, and queries 160.

At process 704, question spans are identified. For example, dataset generation module 170 identifies one or more question spans in natural language questions 140 that may refer to table fields from a structure in database information 150 that occur in the queries 160. For example, the table field may be part of database information 150 and may occur in the SELECT and WHERE clauses in query 160 that is a SQL query.

At processes 706-710, untranslatable questions are generated. Processes 706-708 may occur for one or more random words in the question spans identified in process 704. Process 708 may repeat on one or more table fields that are included in database information 150.

At process 706, a swap technique is performed on one or more words in each question span. For example, dataset generation module 170 may randomly select a word in a question span. Dataset generation module 170 may then replace the word with one or more words that are similar to the selected word. In some instances, dataset generation module 170 may exclude words that are a different part of speech from the selected words or words that appear in table fields in a schema included in database information 150. Dataset generation module 170 may also select up to a configurable number of words to replace the selected words. The question span with the replaced word may form an untranslatable query for a given database information 150. The dataset generation module 170 may repeat the swap technique for each question span and store the untranslatably queries and corresponding database information in a set of untranslatably candidates.

At process 708, a drop technique is performed on one or more question span. For example, dataset generation module 170 may randomly remove a question span (or a word in the question span) from the associated natural language question 140 or replace the question span with "one" or "ones" according to a singular or plural forms of the question span. The dataset generation module 170 may add the natural language question 140 less the corresponding question span and a corresponding database information to a set of untranslatable candidates. The dataset generation module 170 may repeat the drop technique for one or more question spans.

At process 710, a drop schema technique is performed on one or more components in database information, such as one or schemas. For example, dataset generation module 170 may randomly remove one or more table names from a schema and create a new database schema. In some instances, dataset generation module 170 may select table names that do not affect a structure of the database, such as table names that do not have primary or foreign keys. The dataset generation module 170 may add the natural language question 140 and a corresponding new database schema to a set of untranslatable candidates.

At process 712, the set of untranslatable query candidates is filtered. For example, dataset generation module 170 may filter the set of untranslatable query candidates and remove candidates that are similar or can be easily distinguished by stylistic models. In some instances, when multiple untranslatable queries correspond to a single schema, dataset generation module 170 may perform adversarial filtering and select the untranslatable candidate with a highest adversarial filtering score.

At process 714, the translatable and untranslatable queries are merged. For example, dataset generation module 170 may merge the filtered untranslatable queries into the dataset received at process 702. Subsequent to process 714, text to database query translation module 130 may be trained using the dataset.

Some examples of computing devices, such as computing device 100 may include non-transitory, tangible, machine readable media that include executable code that when run by one or more processors (e.g., processor 110) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
receiving a natural language question and a structure in a database;
concatenating a sentence that includes question tokens from the natural language question, query tokens from the structure in the database, and a sentence token;
generating, using a table aware bidirectional encoder representations from transformers (BERT) network, question hidden states for the question tokens, query hidden states for the query tokens and a classification hidden state for the sentence token;
determining, using a translatability predictor network and the classification hidden state, that the natural language question is untranslatable; and
determining, using a confusion span predictor network, a confusion span that identifies at least one question token in the question tokens that causes the natural language question to be untranslatable given the structure in the database.

2. The method of claim 1, further comprising:
substituting in the sentence the at least one question token that is in the confusion span with at least one mask token;
determining, using a masked language model (MLM) BERT network and the sentence with the at least one mask token, at least one token candidate from the structure in the database;
substituting the at least one mask token in the sentence with the at least one token candidate; and
translating, using the table aware BERT network the sentence into an executable query.

3. The method of claim 1, wherein the structure in the database includes a database schema and at least one table name.

4. The method of claim 1, wherein the query tokens are separated using a separation token.

5. The method of claim 1, further comprising:
concatenating the sentence token to the sentence before a first question token in the question tokens.

6. The method of claim 1, further comprising:
training at least one of a table aware BERT network, the translatability predictor network, or the confusion span predictor network using a dataset that includes pairs, each pair including a translatable or untranslatable natural language question and corresponding structure in the database.

7. The method of claim 6, further comprising:
generating the untranslatable natural language question in the dataset by randomly substituting one of the question tokens in the natural language question in a pair from the pairs with another token that has a similar meaning as the one question token.

8. The method of claim 6, further comprising:
generating the untranslatable natural language question in the dataset by randomly removing one of the question tokens in the translatable natural language question in a pair from the pairs.

9. The method of claim 6, further comprising:
generating the untranslatable natural language question by removing one of table names from a structure in the database that corresponds to the translatable natural language question in a pair.

10. A text to database query translating system, the system comprising:
a memory;
at least one processor coupled to the memory and configured to:
receive a natural language question and a structure in a database;
concatenate a sentence that includes question tokens from the natural language question, query tokens from the structure in the database, and a sentence token;
generate, using a table aware bidirectional encoder representations from transformers (BERT) neural network, question hidden states for the question tokens, query hidden states for the query tokens and a classification hidden state for the sentence token;
determine, using a translatability predictor network and the classification hidden state, that the natural language question is untranslatable; and
determine, using a confusion span predictor network, a confusion span that identifies at least one question token in the question tokens that causes the natural language question to be untranslatable given the structure in the database.

11. The text to database query translating system of claim 10, wherein the processor is further configured to:
substitute in the sentence the at least one question token that is in the confusion span with at least one mask token;
determine, using a masked language model (MLM) BERT network and the sentence with the at least one mask token, at least one token candidate from the structure in the database;
substitute the at least one mask token in the sentence with the at least one token candidate; and
translate, using the table aware BERT network the sentence into an executable query.

12. The text to database query translating system of claim 10, wherein the structure in the database includes a database schema.

13. The text to database query translating system of claim 10, wherein the query tokens are separated using a separation token.

14. The text to database query translating system of claim 10, wherein the processor is further configured to:
concatenate the sentence token to the sentence prior to a first question token in the question tokens.

15. The text to database query translating system of claim 10, wherein the processor is further configured to:
train at least one of a table aware BERT network, the translatability predictor network, or the confusion span predictor network using a dataset that includes pairs, each pair including a translatable or untranslatable natural language question and corresponding structure in the database.

16. The text to database query translating system of claim 15, wherein the processor is further configured to:
generate the untranslatable natural language question in the dataset by randomly substituting one of the question tokens in the natural language question in a pair in the pairs with another token that has a similar meaning as the one question token.

17. The text to database query translating system of claim 15, wherein the processor is further configured to:
generate the untranslatable natural language question in the dataset by randomly removing one of the question tokens in the natural language question in a pair of the pairs.

18. The text to database query translating system of claim 15, wherein the processor is further configured to:
generating the untranslatable natural language question by removing one of table names from a structure in the database that corresponds to the translatable natural language question in a pair.

19. A non-transitory machine-readable medium having stored thereon machine-readable instructions executable to cause a machine to perform operations that process a natural language, the operations comprising:
receiving a natural language question and a structure in a database
concatenating a sentence that includes question tokens from the natural language question, query tokens from the structure in the database, and a sentence token;
generating, using a table aware bidirectional encoder representations from transformers (BERT) network, question hidden states for the question tokens, query hidden states for the query tokens and a classification hidden state for the sentence token;
determining, using a translatability predictor network and the classification hidden state, that the natural language question is translatable or untranslatable;
if the natural language question is determined to be translatable, translating, using a decoder network, the natural language question into an executable query; and
if the natural language question is determined to be untranslatable, determining, using a confusion span predictor network, a confusion span that identifies at least one question token in the question tokens that causes the natural language question to be untranslatable given the structure in the database.

20. The non-transitory machine-readable medium of claim 19, wherein the machine is further configured to perform the operations comprising:
substituting in the sentence the at least one question token that is in the confusion span with at least one mask token;
determining, using a masked language model (MLM) BERT network and the sentence with the at least one mask token, at least one token candidate from the structure in the database;

substituting the at least one mask token in the sentence with the at least one token candidate; and translating, using the table aware BERT network the sentence into the executable query.

\* \* \* \* \*